United States Patent [19]

Ochiumi et al.

[11] Patent Number: 4,740,427

[45] Date of Patent: Apr. 26, 1988

[54] VIBRATION-DAMPING COMPOSITE METAL PLATE

[75] Inventors: Masahide Ochiumi; Shinji Horie, both of Yokkaichi; Yukichi Watanabe; Norihiro Sekizuka, both of Yokohama; Akira Itsubo, Yokkaichi, all of Japan

[73] Assignees: Nippon Kokan Kabushiki Kaisha; Mitsubishi Petrochemical Company Limited, both of Tokyo, Japan

[21] Appl. No.: 867,416

[22] Filed: May 15, 1986

Related U.S. Application Data

[62] Division of Ser. No. 740,547, Jun. 3, 1985, abandoned.

[30] Foreign Application Priority Data

Jun. 11, 1984 [JP] Japan ................................. 59-119702
Sep. 1, 1984 [JP] Japan ................................. 59-183121
Sep. 1, 1984 [JP] Japan ................................. 59-183122

[51] Int. Cl.[4] ............................................. B32B 15/08
[52] U.S. Cl. ................................. 428/463; 428/461; 428/458; 525/64; 525/70; 525/80; 525/222; 525/227; 525/240; 525/931
[58] Field of Search ..................... 428/463, 461, 458

[56] References Cited

U.S. PATENT DOCUMENTS

| | | | |
|---|---|---|---|
| 3,027,346 | 3/1962 | Rugg et al. | 525/80 |
| 3,271,188 | 9/1966 | Albert et al. | 428/463 |
| 3,475,516 | 10/1969 | Bauer et al. | 525/80 |
| 3,524,905 | 8/1970 | Coates | 428/463 |
| 3,553,072 | 1/1971 | Oberst et al. | 428/463 |
| 3,554,855 | 1/1971 | Oberst et al. | 428/463 |
| 3,562,090 | 2/1971 | Oberst et al. | 428/463 |
| 3,632,675 | 1/1972 | Foglesong et al. | 525/70 |
| 3,700,754 | 10/1972 | Schmitt et al. | 260/878 R |
| 4,064,198 | 12/1977 | Zeitler et al. | 260/878 |
| 4,391,857 | 7/1983 | Saito et al. | 525/196 |

FOREIGN PATENT DOCUMENTS

| | | | |
|---|---|---|---|
| 108710A | 5/1984 | European Pat. Off. | 428/461 |
| 138557A | 4/1985 | European Pat. Off. | 428/461 |
| 53-42069 | 11/1978 | Japan . | |
| 54-1354 | 1/1979 | Japan . | |
| 57-167360 | 10/1982 | Japan . | |
| 58-198529 | 11/1983 | Japan . | |
| 58-53003 | 11/1983 | Japan . | |
| 59-27934 | 2/1984 | Japan . | |
| 59-80454 | 5/1984 | Japan . | |
| 59-217742A | 12/1984 | Japan | 525/70 |

OTHER PUBLICATIONS

Sumitomo, '454—Abstract of JP 59-80454—5/84.
Sumitomo, '454A—Abstract of JP 59080454-A—5/84.
Handbook of Plastic Wrapping Material—Japan Synthetic Plastic Technical Soc., 3/28/74.
Evaflex Catalog—Mitsui Polychemical KK (Japanese), Selected pages of "Polymer Handbook", John Wiley Co., 1985.
Journal of Polymer Science, Part B: Polymer Letters, vol. 1, pp. 171-176, (1963).

*Primary Examiner*—Carman J. Seccuro
*Attorney, Agent, or Firm*—Frishauf, Holtz, Goodman & Woodward

[57] ABSTRACT

A vibration-damping resin composition of the invention comprises 10 to 95% by weight of an amorphous thermoplastic resin polymer (a) and 90 to 5% by weight of a crystalline thermoplastic polymer (b) incompatible with the polymer (a). The polymer (a) has a glass transition temperature lower than that of the polymer (b) and a maximum $\tan\delta$ of 0.5 or more within a predetermined temperature and frequency range. The polymer (b) has a melting point higher than the glass transition temperature of the polymer (a) and a shear storage modulus of $1 \times 10^8$ dyne/cm$^2$ or more at the temperature and frequency at which the polymer (a) exhibits the maximum $\tan\delta$.

18 Claims, 3 Drawing Sheets

VIBRATION-DAMPING COMPOSITE METAL PLATE

This is a division of application Ser. No. 740,547, filed June 3, 1985 and now abandoned.

BACKGROUND OF THE INVENTION

The present invention relates to a resin composition having an excellent vibration-damping property and, more particularly, to a vibration-damping resin composition suitably adapted as a vibration-damping layer in a vibration-damping composite metal plate.

With recent developments in transportation systems and coexistence of factories and offices with living areas, the problems of noise and vibration generated by various vehicles, machines or apparatuses have become acute from the viewpoints of hygiene and environment. Demand for solution of these problems has become strong. In particular, there is a strong demand for parts such as an oil pan or an engine cover for shielding engine noise from vehicles, and parts for shielding noise from home electrical equipment and metal processing machinery.

As one measure against noise, the user of a vibration-damping composite metal plate such as a vibration-damping composite steel plate has been proposed. The composite metal plate damps vibration by internal friction due to shear deformation of a viscoelastic material of an interlayer of the plate. The composite metal plate is used to surround a noise source. For this reason, the composite metal plate is used in a plate form, and is also formed into a desired shape by, e.g., bending or drawing.

The material of the interlayer of the vibration-damping composite metal plate is conventionally selected from thermoplastic or thermosetting resins. Examples of thermoplastic resins include polymers such as a vinyl acetate resin or a vinyl chloride resin; copolymers such as a vinyl acetate-ethylene copolymer or an acrylonitrile-styrene copolymer; or compositions thereof with a plasticizer. Examples of thermosetting resins include an urethane resin or an epoxy resin.

A resin composition comprising a blend of two or more resin has also been proposed as the material of the interlayer. For example, Japanese Patent Publication No. 79-1354 discloses a composition obtained by adding a viscoelastic polymer such as polyurethane to an acidic copolymer such as an ethylene-acrylic acid copolymer or an ionomer thereof. Japanese Patent Laid-open No. 59-80454 discloses a composition obtained by adding an amorphous polymer to a crystalline polyolefin modified by an unsaturated carboxylic acid or an anhydride thereof.

Japanese Patent Laid-open No. 57-167360 discloses the water dispersion of a composition comprising a styrene-acrylic ester copolymer and a scaly inorganic powder.

A viscoelastic material conventionally used for an interlayer of a vibration-damping composite metal plate has a mechanical loss tangent tan δ which becomes maximum at a temperature higher than its glass transition temperature. At this specific temperature, the rigidity of the viscoelastic material used is abruptly decreased, and the loss factor η of the metal plate is not always good. The good vibration-damping property of a laminated structure such as a vibration-damping composite metal plate is closely associated with the good vibration-dampring property of the viscoelastic material used for the interlayer and the relatively high rigidity thereof. At the region of the low regidity of the viscoelastic material, its vibration-damping property can not be fully exhibited. When this specific temperature is high, the vibration-damping property is abruptly decreased. When two or more resins are blended, since the resins have compatibility, the glass transition temperature of the composition is decreased, and satisfactory vibration-damping property cannot be obtained at high temperatures.

No vibration-damping composite metal plates using a vibration-damping resin composition has satisfied both the requirements of good vibration-damping property and processability such as bending or deep drawing property. For this reason, a vibration-damping resin composition for a vibration-damping layer of a vibration-damping composite metal plate and having excellent vibration-damping property, processability and mechanical strength has been desired.

SUMMARY OF THE INVENTION

The present inventors have found the following fact. When a crystalline thermoplastic resin incompatible with a conventionally used viscoelastic material is added thereto for use as a vibration-damping interlayer, even though the mechanical loss tangent tan δ of the composition more decreases than that of the viscoelastic material alone, excellent vibration-damping property of the vibration-damping composite metal plate is obtained within a high temperature range by adding the crystalline thermoplastic resin, and a high rigidity of the composition can be maintained at a specific temperature at which the mechanical loss tangent tan δ of the viscoelastic material is maximum.

According to a first embodiment of the present invention, there is provided a vibration-damping resin composition comprising 10 to 95% by weight of an amorphous thermoplastic polymer (a) and 90 to 5% by weight of a crystalline thermoplastic polymer (b) incompatible with the polymer (a), the polymer (a) having a glass transition temperature lower than that of the polymer (b) and a maximum tan δ of 0.5 or more within a temperature range of $-50°$ and $150°$ C. and a frequency range of 0.1 to 20,000 Hz, and the polymer (b) having a melting point higher than the glass transition temperature of the polymer (a) and a shear storage modulus of $1 \times 10^8$ dyne/cm$^2$ or more at the temperature and frequency at which the polymer (a) exhibits the maximum tan δ.

According to a second embodiment of the present invention, there is provided a vibration-damping resin composition comprising 5 to 90% by weight of the amorphous thermoplastic polymer (a) of the first embodiment, and 95 to 10% by weight of the crystalline thermoplastic polymer (b) of the first embodiment incompatible with the polymer (a), at least one of monomers constituting the amorphous polymer (a) being copolymerized with the crystalline polymer (b) in the amount of 0.5% by weight or more based on the total amount of the polymer (a).

The composition of the second embodiment has a particularly good mechanical strength, e.g., tensile elongation, and a composite metal plate using this composition has a excellent formability.

An example of the vibration-damping resin composition according to the second embodiment comprises a polymer (A) derived from an acrylic ester and an aromatic vinyl monomer as the amorphous thermoplastic polymer (a), and a crystalline polyolefin (B) as the crystalline thermoplastic polymer (b). When this composition is used for a composite metal plate, the metal plate has an excellent vibration-damping property and has a particularly excellent processability and mechanical strength.

DETAILED DESCRIPTION OF THE PREFERRED EMBODIMENT

Figure 1:
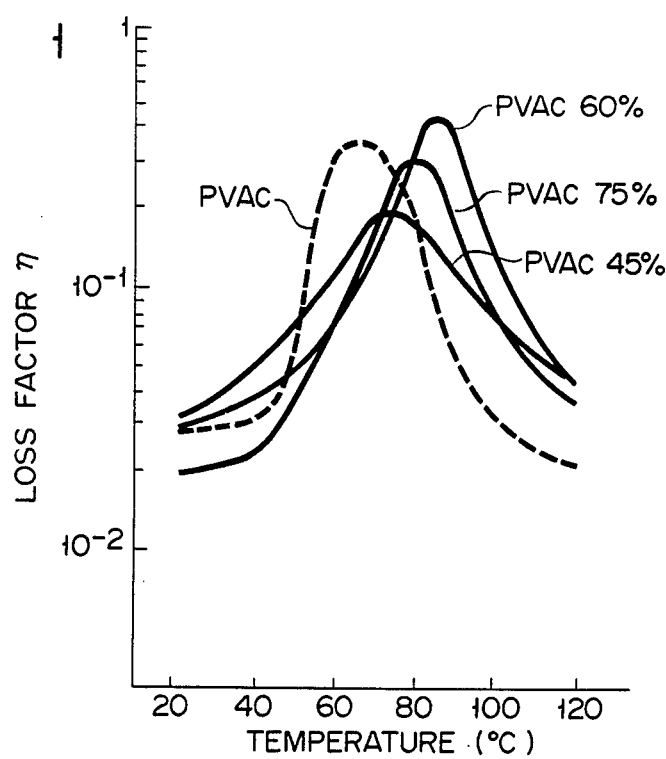
FIG. 1 is a graph showing changes in loss factor $\eta$ of a composite steel plate using a polyvinyl acetate-polypropylene composition as a function of temperature.

A vibration-damping composite metal plate using a vibration-damping resin composition according to the present invention must have a loss factor $\eta$ of 0.05 or more and preferably 0.1 or more within an ambient temperature range of 0° to 150° C. and a noise frequency range of 20 to 20,000 Hz about a noise source. For this purpose, the amorphous thermoplastic polymer (a) used in the composition of the first or second embodiment must have a maximum tan $\delta$ of 0.5 or more and preferably 1.0 or more within a temperature range of −50° to 150° C. and a frequency range of 0.1 to 20,000 Hz.

As such an amorphous polymer (a), various polymers disclosed as polymers or copolymers having a high vibration-damping effect in Japanese Patent Publication No. 78-42069 can be used. Such polymers include a vinyl ester polymer such as polyvinyl acetate or a polyvinyl butyral; a styrene polymer such as polystyrene; a thermoplastic rubber such as polyisobutylene; a halocarbon plastics such as polyvinyl chloride; or an acrylic polymer such as polymethylmethacrylate. Among these polymers, vinyl esters, styrenes and acrylic polymers or copolymers are preferable and copolymers of styrene monomers and acrylic monomers are more preferable.

Also, or a mixture of two or more of such amorphous resins can be used as the polymer (a). The compatibility of the selected polymers is not required as long as a required tan $\delta$ is obtained.

As the crystalline thermoplastic polymer (b) mixed with the polymer (a) in the first or second embodiment of the present invention, a crystalline thermoplastic polymer (b) having incompatibility with the polymer (a) and a shear storage modulus G' of $1 \times 10^8$ dyne/cm² or more, preferably $5 \times 10^8$ dyne/cm² or more, and more preferably $6 \times 10^8$ dyne/cm² or more at the temperature and frequency at which the polymer (a) has a maximum tan $\delta$ is used.

Incompatibility as discussed herein means the state wherein when the dynamic viscoelasticity of the composition consisting of the polymers (a) and (b) is measured, the respective polymers (a) and (b) independently exhibit maximum tan $\delta$. If the polymers (a) and (b) are compatible, the composition exhibits a maximum tan $\delta$ at a single temperature at which the rigidity of the composition is considerably decreased and the loss factor $\eta$ of the vibration-damping composite metal plate may not be satisfactory.

In the composition of the present invention, since the rigidity of the amorphous polymer (a) alone is considerably decreased at a temperature at which the amorphous polymer (a) has a maximum tan $\delta$, the crystalline polymer (b) having a high rigidity at such a temperature must be mixed with the polymer (a) in order to maintain a high rigidity of the composition. For this purpose, the polymer (b) must be incompatible with the polymer (a), and have a melting point higher than the glass transition temperature of the polymer (a). Since the maximum loss factor $\eta$ of a composite metal plate is obtained at a higher temperature than that at which the maximum tan $\delta$ of the resin of the interlayer is obtained, if the melting point of the polymer (b) is near the glass transition temperature of the polymer (a), the polymer (b) in the composition is softened or melts at a temperature at which the loss factor $\eta$ of the composite metal plate is exhibited by the tan $\delta$ of the composition attributable to the polymer (a). Then, the rigidity of the composition is significantly reduced, and the loss factor $\eta$ of the vibration-damping composite metal plate may be rendered poor. For this reason, the melting point of the polymer (b) must be higher than the glass transition temperature of the polymer (a) by preferably 30° C. or more and more preferably by 50° C. or more.

One or more resins may be used as the polymer (b) herein. Examples of crystalline polymers (b) may include a crystalline α-olefin resin such as polyethylene or polypropylene, or a crystalline condensation polymer such as polyamide or polyester. Crystalline α-olefin resins are preferably high density polyethylene, polypropylene, and higher α-olefin polymers higher than high-density polyethylene and polypropylene are particularly preferable since such higher α-olefin polymers have a high melting point.

A preferable composition of the amorphous thermoplastic polymer (a) and the crystalline thermoplastic polymer (b) is a vinyl ester, styrene or acrylic polymer or copolymer as the polymer (a) and an ethylene or propylene polymer as the polymer (b).

The amount of the amorphous polymer (a) in the vibration-damping resin composition of the present invention is 10 to 95% by weight, preferably 20 to 90% by weight, and more preferably 30 to 80% by weight, in the composition of the first embodiment. In the composition of the second embodiment, the amount of the polymer (a) is 5 to 90% by weight, preferably 20 to 70% by weight and more preferably 30 to 60% by weight. A vibration-damping composite metal plate using a resin composition according to the present invention for an interlayer must have a loss factor $\eta$ of 0.05 or more and preferably 0.1 or more. In either embodiment, if the amount of the polymer (a) is less than the prescribed amount, the tan $\delta$ of the composition attributable to the polymer (a) is decreased. As a result, the loss factor $\eta$ of a composite metal plate using this composition is also decreased, and satisfactory vibration-damping performance may not be obtained. On the other hand, if the amount of the polymer (a) is more than the prescribed amount, satisfactory processability of a composite metal plate may not be obtained.

In the composition of the first embodiment, the amount of the crystalline polymer (b) is 90 to 5% by weight, preferably 80 to 10% by weight and more preferably 70 to 20% by weight depending upon the amount of the polymer (a) used. In the composition of the second embodiment, the amount of the polymer (b) is 95 to 10% by weight, preferably 80 to 30% by weight and more preferably 70 to 40% by weight depending upon the amount of the polymer (a). In the composition of either the first or second embodiment, if the amount of the polymer (b) is smaller than the lower limit, the rigidity of the composition is impaired, and the loss factor $\eta$ and processability of a vibration-damping composite metal plate using this composition are also impaired. On the other hand, if the amount of the polymer (b) exceeds the upper limit, in the composition of the first or second embodiment, the maximum tan $\delta$ of the composition attributable to the polymer (a) is lowered, and the loss factor $\eta$ of a vibration-damping composite metal plate using this composition is impaired.

In the composition of the second embodiment of the present invention, at least one of monomers constituting the amorphous polymer (a) is copolymerized (by graft or block copolymerization) with the crystalline thermoplastic polymer (b). The copolymerization amount is 0.5% by weight or more preferably 1% by weight or more, and more preferably 3% by weight or more based on the total weight of the polymer (a). When the copolymerization amount is this value, the mechanical strength of the composition, e.g., the tensile elongation is improved, and processability, e.g., bending and drawing performance of a vibration-damping composite metal plate using this composition is much improved.

The composition of the first or second embodiment of the present invention is obtained by melt kneading or solution blending an amorphous polymer (a) and a crystalline polymer (b). The composition of the second embodiment is preferably prepared as a block or graft copolymer. Examples of such polymers may include an ethylene-vinyl acetate block copolymer or polypropylene-vinyl acetate graft copolymer. A copolymerization method and a simple kneading method may be used in combination.

The block or graft copolymerization method may be various block or graft copolymerization methods including a method disclosed in Japanese Patent Laid-open No. 59-27934 wherein an amorphous polymer (a) is copolymerized with a polymer (b) by using a polymer peroxide of the amorphous polymer (a), a method disclosed in Japanese Patent Laid-open No. 58-198529 wherein functional groups introduced in polymers (a) and (b) are reacted to prepared a copolymer, and a method disclosed in Japanese Patent Publication No. 83-53003 wherein a resin and a vinyl monomer are subjected to water suspension graft copolymerization.

As an example of the vibration-damping resin composition of the second embodiment of the present invention, a composition comprising a polymer (A) derived from an acrylic ester and a aromatic vinyl monomer as the amorphous thermoplastic polymer (a) and a crystalline polyolefin (B) as the crystalline thermoplastic polymer (b) has a excellent loss factor and a particularly excellent processability and mechanical properties such as tensile elongation. The composition satisfies the requirement of good balance in loss factor, mechanical strength and processability and is particularly useful as a composition for a vibration-damping layer of a vibration-damping composite metal plate.

The polymers (A) derived from the acrylic esters and aromatic vinyl monomers include copolymers therebetween and the acrylic esters and aromatic vinyl monomers copolymerized with the above-mentioned polyolefin. Examples of the acrylic esters include alkyl esters of acrylic acid or methacrylic acid such as alkyl esters having 1 to 18 carbon atoms of (metha)acrylic acid, 2-alkoxyethyl esters of (metha)acrylic acid, or diethyleneglycol monoalkylesters of (metha)acrylic acid, e.g., methyl acrylate, ethyl acrylate, n-propyl acrylate, iso-propyl acrylate, n-butyl acrylate, iso-butyl acrylate, pentyl acrylate, hexyl acrylate, heptyl acrylate, octyl acrylate, 2-ethylhexyl acrylate, nonyl acrylate, iso-nonyl acrylate, decyl acrylate, undecyl acrylate, lauryl acrylate, stearyl acrylate, cyclohexyl acrylate, 2-methoxyethyl acrylate, 2-ethoxyethyl acrylate, 2-butoxyethyl acrylate, diethyleneglycol monoethylether acrylate, diethyleneglycol monobutylether acrylate, linevol acrylate, methyl methacrylate, ethyl methacrylate, propyl methacrylate, n-butyl methacrylate, iso-butyl methacrylate, pentyl methacrylate, hexyl methacrylate, heptyl methacrylate, octyl methacrylate, 2-ethylhexyl methacrylate, nonyl methacrylate, iso-nonyl methacrylate, decyl methacrylate, undecyl methacrylate, lauryl methacrylate, tridecyl methacrylate, stearyl methacrylate, cyclohexyl methacrylate, or benzyl methacrylate.

Preferred examples of the acrylic esters are n- or iso-alkyl esters having 1 to 4 carbon atoms of acrylic acid, alkyl esters having 5 to 18 carbon atoms of acrylic acid, 2-alkoxyethyl esters having 1 to 4 carbon atoms of acrylic acid, diethyleneglycol monoalkylether esters having 1 to 4 carbon atoms of acrylic acid, n-butyl methacrylate, and alkyl esters having 5 to 18 carbon atoms of methacrylic acid. Particularly preferable examples of the acrylic esters include n-butyl acrylate, 2-ethylhexyl acrylate, linevol acrylate, iso-nonyl acrylate, 2-butoxyethyl acrylate, diethyleneglycol monobutylether acrylate, lauryl methacrylate, and tridecyl methacrylate.

Examples of the aromatic vinyl monomers include styrene; nucleus substituted styrenes such as methyl styrene, dimethyl styrene, ethyl styrene, isopropyl styrene, or chlorostyrene; or $\alpha$-substituted styrenes such as $\alpha$-methyl styrene or $\alpha$-ethyl styrene. Preferred examples of the aromatic vinyl monomers include styrene, 4-methyl styrene and $\alpha$-methyl styrene. Styrene is particularly preferable.

An acrylic ester and an aromatic vinyl monomer are copolymerized herein so as to allow free adjustment of the glass transition temperature of the copolymer between the glass transition temperature of the acrylic ester homopolymer and that of the aromatic vinyl homopolymer by variously changing the composition, and thereby optimally setting a temperature range and a frequency range within which the loss factor of a vibration-damping composite metal plate is optimum.

Acrylic ester homopolymers generally have glass transition temperatures lower than those of aromatic vinyl homopolymers. In order to allow a great adjustment of the glass transition temperatures of the copolymers from monomers constituting the above-mentioned homopolymers, an acrylic ester homopolymers should preferably have glass transition temperatures as lower as possible than those of aromatic vinyl homopolymers.

Copolymerization of an acrylic ester monomer and an aromatic vinyl monomer can be performed by conventional random polymerization such as solution polymerization, emulsion polymerization, and suspension polymerization. More than one type of copolymer obtained may be used in a resin composition according to the present invention.

The amount of the acrylic ester in the derived polymer can be suitably selected in order to set the temperature for obtaining the maximum loss factor $\eta$ at the operating temperature of a vibration-damping composite metal plate. However, in general, the amount of the acrylic ester falls within a range of 5 to 95% by weight. The copolymer can be obtained by copolymerizing a comonomer containing a small amount of, e.g., 30% by weight or less of another monomer as a third component, as needed. For example, in order to improve adhesion with a metal plate, a copolymer obtained by comopolymerizing a comonomer containing a monomer having a carboxyl group, an epoxy group, a hydroxyl group or the like is preferably used.

Examples of the crystalline polyolefin (B) to be used herein with the polymer (A) may include polymers of $\alpha$-olefins such as ethylene, propylene, butene-1, pentene-1,3-methylbutene-1, hexene-1, or 4-methylpentene-1; copolymers of two or more thereof; or copolymers thereof with other monomers mainly consisting of such $\alpha$-olefins. Examples of such polyolefins include low density polyethylene, high density polyethylene, isotactic polypropylene, an ethylene-propylene copolymer, an ethylene-butene-1 copolymer, an ethylene-octene-1 copolymer, a propylene-butene-1 copolymer, polybutene-1, poly 4-methylpentene-1 or the like. In view of high rigidity and heat-resistance, high density polyethylene and propylene polymers are preferable, and propylene polymers are particularly preferable.

The polymer (A) derived from an acrylic ester and an aromatic vinyl monomer includes a copolymer component copolymerized with the crystalline polyolefin (B). More than one crystalline polyolefin (B) can be used. However, at least a portion of such polyolefins is copolymerized with one or both the acrylic ester and the aromatic vinyl monomer. As has been described with reference to the composition according to the second embodiment of the present invention, the copolymerization amount is 0.5% by weight or more, preferably 1% by weight or more, and more preferably 3% by weight or more based on the total weight of the polymer (A). When the copolymerization amount with the crystalline polyolefin (B) is the above-mentioned amount, the resultant composition has a particularly good mechanical strength, and a composite metal plate using this composition has a particularly good processability.

A composition comprising the polymer (A) and the crystalline polyolefin (B) can be obtained by kneading these components by a conventional kneading method. However, in order to obtain good bending and drawing processability of a vibration-damping composite metal plate and ease in the preparation of a composition, a modified substance obtained by graft or block copolymerizing a crystalline polyolefin with predetermined amounts of an acrylic ester and an aromatic vinyl monomer in a suspension system, a solution system or a molten system, preferably, in a water suspension is particularly preferable.

The composition of the present invention may further contain various additives, plasticizers, fillers, elastomers and the like in amounts such that the desired properties of the composition are not impaired. A plasticizer when added can shift the temperature at which the composition has a maximum tan $\delta$ to the lower temperature side, adjust the vibration-damping temperature range of a vibration-damping composite metal plate, impart viscidness to the composition to improve adhesion with a metal plate, and soften the composition to eliminate brittleness thereof. A filler when added serves to maintain a high rigidity at the temperature at which the composition exhibits a maximum tan $\delta$ and thus improve the loss factor $\eta$. In order to improve various physical properties of the composition, a styrene-butadiene block copolymer, a hydrogenated substance thereof, an ethylene-propylene rubber or the like is preferably used as an elastomer.

In order to impart conductivity and thereby improve weldability and coatability of a vibration-damping composite metal plate, the composition of the present invention may contain an electroconductive filler such as carbon black or metal fiber. In order to improve the flame retardancy of the composition, various flame retardants such as antimony trioxide or aluminum hydroxide can be added.

In order to improve adhesion with a metal plate, the composition of the present invention is modified by a carboxyl group, an epoxy group, a hydroxyl group or the like, or crosslinking.

Such modification can be performed in any step of preparing the composition. For example, in the case of preparing a composition consisting of a polymer (A) and a crystalline polyolefin (B), methods can be adopted including a method wherein a crystalline polyolefin (B) modified by a carboxyl group, an epoxy group or a hydroxyl group or a polymer (A) modified by the same group and derived from an acrylic ester and an aromatic vinyl monomer is added as a resin component, a method wherein the above-mentioned polar group is added in the step of copolymerizing at least one of an acrylic ester and an aromatic vinyl monomer with a crystalline polyolefin, a method wherein the above-mentioned polar group is added after the composition of the present invention is prepared.

The composition of the present invention preferably has a shear storage modulus as a composition of $8 \times 10^7$ dyne/cm$^2$ or more and preferably $1 \times 10^8$ dyne/cm$^2$ or more at a temperature at which the polymer (a) exhibits a maximum tan $\delta$.

When a vibration-damping resin composition according to the present invention is laminated with metal plates, in particular, with steel plates, the obtained vibration-damping composite steel plate can maintain a good vibration-damping property to a higher temperature range than in the case wherein only the polymer (a) used in the present invention is used for an interlayer. When only the polymer (a) is used, even if the tan $\delta$ is high, shear storage modulus G' is abruptly decreased at a temperature for maintaining maximum tan $\delta$, and a loss factor $\eta$ acceptable as a composite steel plate is not obtainable. In contrast to this, the composition of the present invention undergoes only a small decrease in shear storage modulus G' at a temperature at which the composition exhibits a maximum tan $\delta$ attributable to the polymer (a). Therefore, even if the tan $\delta$ of the composition is decreased to the slightly lower lever than the level of the tan $\delta$ of the polymer (a), the loss factor $\eta$ of the composite steel plate is kept optimal. In some cases, a loss factor $\eta$ higher than that of a composite steel plate using a resin composition consisting of only the polymer (a) can be obtained. Since the resin (b) used herein is crystalline, a resin having a high melting point can be used. For this reason, a polymer (a) which exhibits a maximum tan $\delta$ at a high temperature can be used to obtain a vibration-damping resin composition having an excellent loss factor within a high temperature range.

The resin composition according to the present invention has a high shear storage modulus within a temperature range in which a composite steel plate using the composition exhibits the vibration-damping property, and therefore an excellent strength is advantageous in the case of using the composition as a structural material. Furthermore, since the composition also has a high shear storage modulus at normal temperatures, a composite steel plate using this composition also has excellent processability such as bending and drawing performance. Since the molecules of the polymer (a) and the molecules of the polymer (b) are dispersed with the molecules of the copolymer among them, the plate also has an excellent mechanical strength.

The composition of the present invention achieves a good balance in a loss factor, adhesivity, and mechanical strength. A vibration-damping steel plate using the resin composition of the present invention therefore has an excellent balance in a vibration-damping property, drawing property and bending property.

Figure 6:
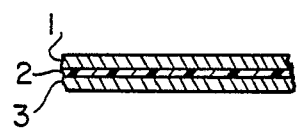
FIG. 6 is a sectional view of a portion of a composite steel plate.

A vibration-damping composite metal plate can be manufactured from the composition of the present invention by various conventional methods. For example, a solution of the composition is prepared and is applied between metal plates, the assembly is dried and the plates are hot-pressed. Alternatively, the composition is formed into a film and is sandwiched between metal plates, and the plates are laminated by a press or a heating roll. Still alternatively, the composition in the molten form is extruded in a film form 2 between metal plates 1 and 3, thereby laminating the plates to form the structure illustrated in FIG. 6. When a film of the composition is laminated with metal plates, the process can be performed by means of a polyolefin modified by an unsaturated carboxylic acid or an anhydride thereof, or the film of the composition can be subjected to a surface treatment such as a corona discharge treatment or flame treatment before adhesion to metal plates with adhesives, or surfaces of the metal plates can be subjected to a surface treatment such as chemical conversion treatment before lamination. The composition of the present invention in the molten state can be formed into a film form, and allows simplification of the process of preparing a vibration-damping composite metal plate as compared with conventional vibration-damping materials.

A steel plate used in a vibration-damping composite steel plate preferably has a thickness of 0.2 to 3.2 mm, and the layer of the composition according to the present invention preferably has a thickness of 0.03 to 0.5 mm.

The present invention will now be described by way of its Examples. However, some of the specific terms used herein will first be defined. The mechanical loss tangent tan $\delta$ and the rigidity (shear storage modulus) G' of the polymer or a composition thereof are obtained by measurement of the dynamic viscoelasticity of the polymer or composition, and values obtained are different in accordance with each measurement method adopted. The mechanical loss tangent tan $\delta$ and the shear storage modulus G' used herein were measured by the forced torsional oscillation method at a frequency of 10 Hz. The temperature dependency of the mechanical loss tangent tan $\delta$ was examined and the obtained value was defined as tan $\delta$max. A vibration-damping composite steel plate was obtained by forming a vibration-damping resin composition into a film, and sandwiching the film between 0.8-mm thick steel plates and laminating the assembly by compression. The vibration-damping layer had a thickness of 0.1 to 0.2 mm in each Example except for Example 2, and had a thickness of 0.5 mm in Example 2. The loss factor $\eta$ of the vibration-damping composite steel plate is the loss factor $\eta$ measured at 1,000 Hz by the resonance response method by mechanical impedance (the loss factor is calculated by the sharpness of the resonance curve in frequency responce function). The melting point of each crystalline resin used is a melt end temperature measured by a DSC (differential scanning calorimeter).

The tensile strength of the composition was measured such that a 0.5-mm thick dumbbell of the composition was measured at a test speed of 50 mm/min in accordance with JIS (Japanese Industrial Standard)-K-6758.

The content of the polymer (a) copolymerized with the polymer (b) was measured by a method wherein an obtained modified copolymer was extracted in boiling methyl ethyl ketone, and the unextracted component was vacuum dried and analyzed by infrared analysis (Examples 6 and 7). The content of the monomer copolymerized with the polyolefin (B) was measured by the method wherein an obtained modified propylene-ethylene copolymer was dissolved in boiling xylene and allowed to reprecipitate in acetone, and the precipitate was vacuum dried and sujected to infrared analysis to determine the contents of styrene and acrylic ester (Examples 8 and 9).

EXAMPLE 1

A polyvinyl acetate having a glass transition temperature of about 28° C. (available from Wako Junyaku Kogyo. polymerization degree: 1,400 to 1,600. to be referred to as PVAc hereinafter) and a polypropylene having a melting point of 167° C. ("Mitsubishi Noblen MH8" available from Mitsubishi Petrochemical Co., Ltd., referred to as PP hereinafter) were kneaded in various amounts, and each resultant composition was sandwiched between two steel plates having a thickness of 0.8 mm to provide a vibration-damping composite steel plate. The interlayer of the composite steel plate had a thickness of 0.1 to 0.2 mm.

Table 1 below shows the maximum loss factor $\eta$max and the corresponding temperature T$\eta$max of each composite steel plate, the shear storage modulus G' of the composition at the temperature T tan $\delta$max at which the composition exhibits the maximum mechanical loss tangent tan $\delta$, and the loss factor $\eta$ at 1,000 Hz and 80° C. of each composite steel plate. FIG. 1 shows changes in loss factor $\eta$ of vibration-damping steel plates of some of various compositions, as a function of temperature.

Figure 2:
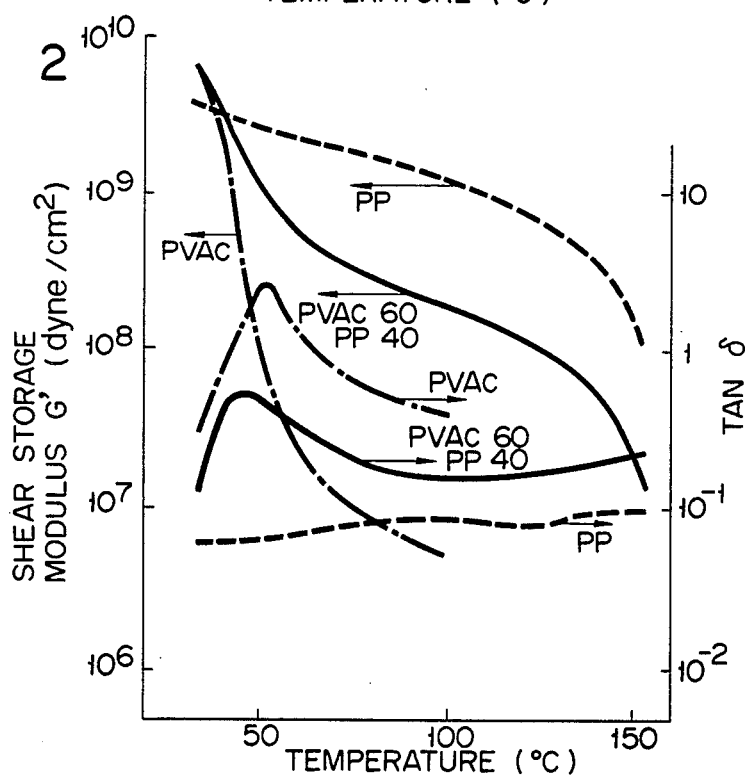
FIG. 2 is a graph showing changes in shear storage modulus G' and tan $\delta$ of the same composition as in FIG. 1, as a function of temperature.

FIG. 2 shows changes, as a function of temperature, in the shear storage modulus G' and the mechanical loss tangent tan $\delta$ at a frequency of 10 Hz for a composition consisting of only PVAc, a composition consisting of only PP and a composition consisting of PVAc and PP in a mixing ratio of 60:40 (based on weight). The PVAc has a maximum tan $\delta$ and a corresponding temperature of 2.6 and 54° C., respectively, and the PP has a shear storage modulus G' at 54° C. of $2.5 \times 10^9$ dyne/cm². With the composition containing 60% by weight of PVAc, the maximum tan δ is decreased to 0.5. However, the loss factor η of a vibration-damping steel plate using this composition is better in a high temperature region than that of the composition consisting of only PVAc, as can be seen from FIG. 1.

TABLE 1

| Composition (wt %) | | | G' of composition at Ttanδmax | Actual loss factor η (1,000 Hz, |
|---|---|---|---|---|
| PVAc | PP | ηmax | Tηmax (°C.) | (dyne/cm²) | 80° C.) |
| 100 | — | 0.30 | 70 | $5.6 \times 10^7$ | 0.18 |
| 75 | 25 | 0.31 | 80 | $4.5 \times 10^8$ | 0.31 |
| 60 | 40 | 0.42 | 84 | $1.3 \times 10^9$ | 0.40 |
| 45 | 55 | 0.19 | 75 | $2.4 \times 10^9$ | 0.18 |
| 30 | 70 | 0.06 | 70 | $3.0 \times 10^9$ | 0.05 |

EXAMPLE 2

Figure 3:
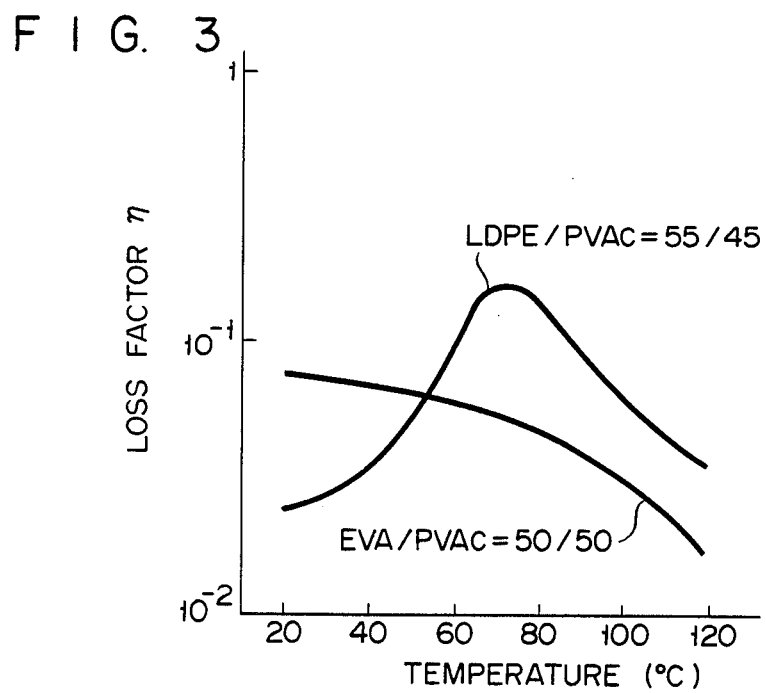
FIG. 3 is a graph showing changes in loss factor $\eta$ of a composite steel plate using a composition obtained by adding a low-density polyethylene or an ethylene-vinyl acetate copolymer to polyvinyl acetate as a function of temperature.

A composition was prepared by adding 55 parts by weight of low density polyethylene ("Yukalon ZC-30" available from Mitsubishi Petrochemical Co., Ltd., referred to as LDPE hereinafter) having a melting point of 109° C. to 45 parts by weight of the PVAc used in Example 1. The mixture was kneaded and was formed into an interlayer having a thickness of 0.5 mm between two steel plates each having a thickness of 0.8 mm, thereby providing a composite steel plate. FIG. 3 shows changes in the loss factor η at 1,000 Hz of the prepared composite steel plate as a function of temperature. The plate had a maximum loss factor ηmax of 0.15 at 75° C., and a shear storage modulus G' of $6.8 \times 10^8$ dyne/cm² at a temperature at which the composition exhibited a maximum mechanical loss tangent tan δ.

The LDPE had a shear storage modulus G' of $3.9 \times 10^8$ dyne/cm² at 54° C. at which the PVAc exhibited the maximum tan δ.

COMPARATIVE EXAMPLE 1

A composition was prepared by adding 50 parts by weight of an ethylene-vinyl acetate copolymer ("Yukalon-EVA X-700" available from Mitsubishi Petrochemical Co., Ltd., referred to as EVA hereinafter) having a melting point of 75° C. to 50 parts by weight of the PVAc used in Example 1. A composite steel plate having an interlayer of 0.5 mm thickness and similar to that in Example 2 was prepared using the obtained composition. FIG. 3 shows changes in the loss factor η at 1,000 Hz of the obtained composite steel plate as a function of temperature.

The EVA had a shear storage modulus G' of $1.0 \times 10^7$ dyne/cm² at 54° C. at which a PVAc exhibited the maximum tan δ. Thus, the shear storage modulus of the EVA is unsatisfactory. In addition, due to the compatibility of the EVA with the PVAc, the loss factor η of the obtained composite steel plate is low within the overall temperature range and the peak of η due to addition of the PVAc is not clear, as shown in FIG. 3.

EXAMPLE 3

Figure 4:
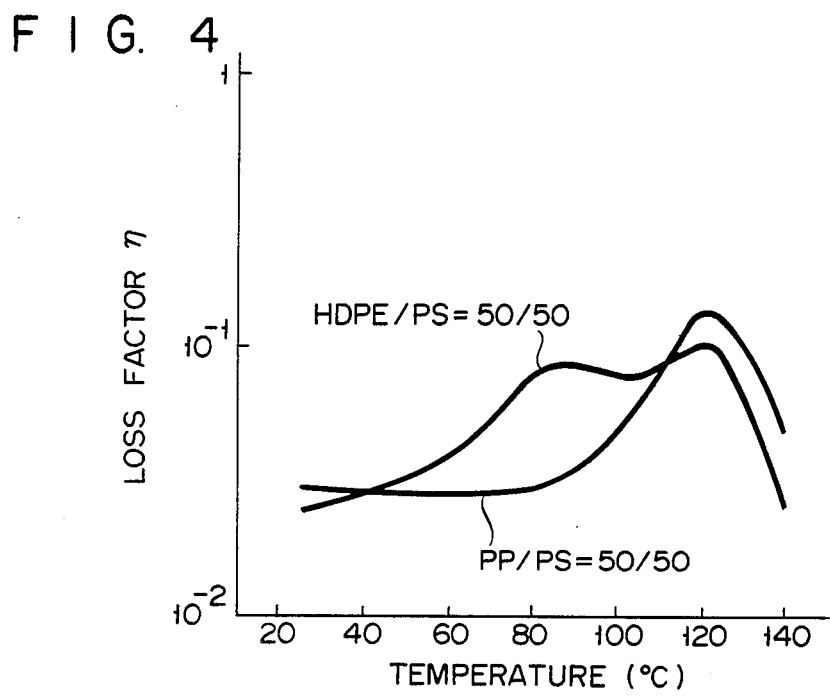
FIG. 4 is a graph showing changes in loss factor $\eta$ of a composite steel plate using a composition obtained by adding polypropylene or a high-density polyethylene to polystyrene as a function of temperature.

FIG. 4 shows changes, as a function of temperature, in the loss factor η of a composite steel plate using a mixture consisting of equal amounts of a polystyrene ("Dialex HF 77" available from Mitsubishi Monsanto Co., Ltd., referred to as PS hereinafter) having a glass transition temperature of about 100° C. and a polypropylene ("Noblen FX4" available from Mitsubishi Petrochemical Co., Ltd.) having a melting point of 152° C.

The PS had a maximum tan δ of 3.4 at 109° C., and the polypropylene had a shear storage modulus G' of $9.8 \times 10^8$ dyne/cm² at this temperature. The obtained composite steel plate had a maximum loss factor η of 0.14 at 120° C., and a shear storage modulus G' of $1.8 \times 10^8$ dyne/cm² at the temperature at which the composition had a maximum tan δ.

EXAMPLE 4

FIG. 4 also shows changes, as a function of temperature, in the loss factor η of a composite steel plate using a composition consisting of high density polyethylene ("Yukalon-HD, BZ50A" available from Mitsubishi Petrochemical Co., Ltd., referred to as HDPE hereinafter) having a melting point of 133° C. in place of the polypropylene used in Example 3.

The HDPE had a shear storage modulus G' of $5.1 \times 10^8$ dyne/cm² at a temperature of 109° C. at which the PS had a maximum tan δ. The composition had a shear storage modulus G' of $1.3 \times 10^7$ dyne/cm² at the temperature at which the composition had a maximum tan δ. The composite steel plate had a maximum loss factor η of 0.11 at 120° C., as can be seen from FIG. 4.

EXAMPLE 5

Vibration-damping composite steel plates were prepared following the same procedures as in Example 1 except that a styrene-acrylic ester copolymer having a glass transition temperature of about 20° C. (50% by weight styrene content, 210,000 molecular weight, referred to as SAE hereinafter) was used in place of the PVAc used in Example 1.

Figure 5:
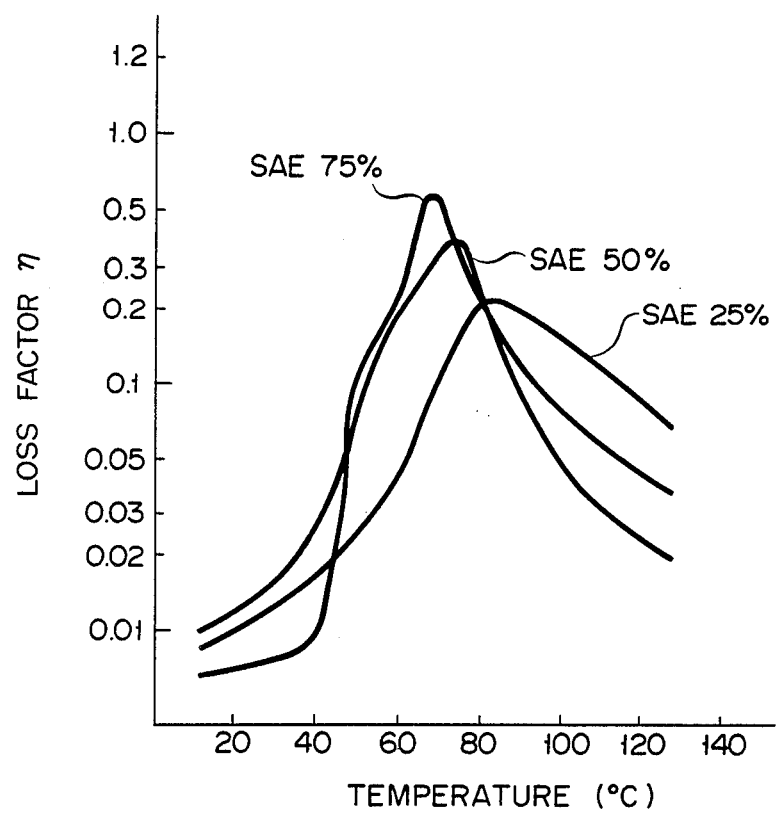
FIG. 5 is a graph showing changes in loss factor $\eta$ of a composite steel plate using a composition consisting of a styrene-acrylic ester copolymer and polypropylene as a function of temperature.

Table 2 shows the maximum loss factor ηmax and the corresponding temperature (Tηmax) of each composite steel plate, and the shear storage modulus G' of the composition at a temperature T tan δmax at which the composition has a maximum tan δ. FIG. 5 shows changes in the loss factor η of some of various vibration-damping steel plates as a function of temperature.

The SAE had a maximum tan δ and a corresponding temperature of 2.9 and 40° C., respectively, and the PP had a shear storage modulus G' of $3.2 \times 10^9$/cm² at 40° C.

TABLE 2

| Composition (wt %) | | | | G' of composition at Ttanδmax |
|---|---|---|---|---|
| SAE | PP | ηmax | Tηmax (°C.) | (dyne/cm²) |
| 75 | 25 | 0.53 | 67 | $2.0 \times 10^8$ |
| 60 | 40 | 0.40 | 70 | $4.9 \times 10^8$ |
| 50 | 50 | 0.37 | 74 | $1.6 \times 10^9$ |
| 40 | 60 | 0.30 | 84 | $2.7 \times 10^9$ |
| 25 | 75 | 0.18 | 85 | $3.4 \times 10^9$ |

EXAMPLE 6

Preparation of Copolymer 1

Pure water, tribasic calcium phosphate as a suspending agent, and sodium dodecyl benzene sulfonate were charged in the amounts of 20 kg, 0.6 kg, and 0.06 kg, respectively, into an autoclave having a volume of 50 l to prepare an aqueous medium. Five kilograms of a maleic anhydride-modified propylene-ethylene copolymer (melt flow rate (MFR): 15 g/10 min.; 5% by weight ethylene content; 0.4% by weight maleic anhydride content; referred to as PP(1) hereinafter) having a particle size of 3 to 4 mm were added to the medium, and the mixture was stirred to suspend the copolymer in the medium. Separately, 15 g of benzoyl peroxide were dissolved in 5 kg of vinyl acetate, and the solution was added to the above suspension. The autoclave was heated to a temperature of 60° C. The mixture was stirred at this temperature for 5 hours to impregnate the propylene-ethylene copolymer particles with the vinyl acetate containing a polymerization initiator.

The suspension was heated to 80° C. and was stirred at this temperature for 5 hours to perform polymerization. The suspension was thereafter heated to 90° C. and was kept at this temperature for 5 hours to complete polymerization.

After the autoclave was cooled, the solid content was removed from the autoclave and was washed with water to obtain 10 kg of vinyl acetate-modified propylene-ethylene copolymer particles (Copolymer 1). The obtained, modified propylene-ethylene copolymer had a vinyl acetate content of 50% by weight. The grafted amount of the vinyl acetate was 15% by weight. The copolymer 1 had a tensile elongation of 360%, while a composition consisting of equal amounts of polyvinyl acetate and a maleic anhydride-modified propylene-ethylene copolymer had a tensile elongation of only 20%.

Mixtures of the copolymer 1, the maleic anhydride-modified propylene-ethylene copolymer (PP(1)) used in preparation of the copolymer 1, and polyvinyl acetate PVAc were mixed in various mixing ratios. An antioxidant was added to each mixture and the mixture was kneaded. Each composition obtained was sandwiched between two steel plates each having a thickness of 0.8 mm, thereby providing a vibration-damping composite steel plate. The composition as the interlayer had a thickness of 0.1 to 0.2 mm.

Table 3 shows the maximum loss factor $\eta$max at 1,000 Hz, a corresponding temperature T$\eta$max, and the shear storage modulus G' of the composition at the temperature T tan $\delta$max at which the composition has the maximum tan $\delta$, for each of the obtained composite steel plates.

The PVAc had a maximum tan $\delta$ at 10 Hz and a corresponding temperature T tan $\delta$max of 2.6 and 55° C., respectively. The PP(1) had a shear storage modulus G' at 55° C. of $1.9 \times 10^9$ dyne/cm$^2$.

TABLE 3

| Composition (wt %) | | | | T$\eta$max | G' of composition at Ttan$\delta$max |
|---|---|---|---|---|---|
| Copolymer 1 | PVAc | PP(1) | $\eta$max | (°C.) | (dyne/cm$^2$) |
| — | 100 | — | 0.30 | 70 | $5.6 \times 10^7$ |
| 50 | 50 | — | 0.32 | 80 | $4.3 \times 10^8$ |
| 80 | 20 | — | 0.41 | 84 | $1.0 \times 10^9$ |
| 100 | — | — | 0.20 | 75 | $1.7 \times 10^9$ |
| 60 | — | 40 | 0.08 | 70 | $2.3 \times 10^9$ |

EXAMPLE 7

Preparation of Copolymer 2

A styrene-modified propylene-ethylene copolymer (copolymer 2) was prepared following the same procedures as in preparation of the copolymer 1 except that styrene was used in place of vinyl acetate. The obtained, modified propylene-ethylene copolymer had a styrene content of 50% by weight, and the grafted amount of styrene of 10% by weight. The copolymer 2 had a tensile elongation of 90%, while a composition consisting of equal amounts of polystyrene and a maleic anhydride-modified propylene-ethylene copolymer had a tensile elongation of 10%.

Preparation of Copolymer 3

A n-butyl methacrylate-modified propylene-ethylene copolymer (copolymer 3) was prepared following the same procedures as in preparation of the copolymer 1 except that n-butyl methacrylate was used in place of vinyl acetate. The obtained, modified propylene-ethylene copolymer had a n-butyl methecrylate content of 50% by weight, and the grafted amount of n-butyl methacrylate of 10% by weight. The copolymer 3 had a tensile elongation of 200%, while a composition consisting of equal amounts of poly-n-butyl methacrylate and a maleic anhydride-modified propylene-ethylene copolymer had a tensile elongation of 10%.

Composite steel plates were prepared following the same procedures as in Example 6 using copolymers 2 and 3, separately. Table 4 shows the maximum loss factor $\eta$max at 1,000 Hz and the corresponding temperature T$\eta$max of each composite steel plate, and the shear storage modulus G' of the composition at the temperature T tan $\delta$max at which the composition has the maximum tan $\delta$.

The polystyrene had the maximum tan $\delta$ of 3.4 at 110° C. The PP(1) had a shear storage modulus G' at this temperature of $1.8 \times 10^8$ dyne/cm$^2$, and the poly-n-butyl methacrylate had a maximum tan $\delta$ at 50° C. of 1.6. The PP(1) at this temperature had a shear storage modulus G' of $1.5 \times 10^9$ dyne/cm$^2$.

TABLE 4

| Copolymer | $\eta$max | T$\eta$max (°C.) | G' of composition at Ttan$\delta$max (dyne/cm$^2$) |
|---|---|---|---|
| copolymer 2 | 0.15 | 120 | $1.5 \times 10^8$ |
| copolymer 3 | 0.10 | 70 | $1.3 \times 10^9$ |

EXAMPLE 8

Preparation of Styrene-Isononyl Acrylate Copolymer

Pure water and polyvinyl alcohol as a suspending agent were charged in amounts of 35 kg and 320 g into an autoclave having a volume of 50 l to prepare an aqueous medium. After dissolving 180 g of benzoyl peroxide in 10.8 kg of styrene (SM) and 7.2 kg of isononyl acrylate (INA), the obtained mixture was added to the medium and the mixture was stirred to prepare a suspension. After nitrogen was introduced into the autoclave in order to substitute its interior with nitrogen, the autoclave was heated to 60° C. The suspension was stirred at this temperature for 5 hours to perform prepolymerization. The autoclave was heated to 90° C. while increasing the stirring speed. The suspension was then stirred at this temperature for 3 more hours to complete polymerization. After cooling, the solid content of the autoclave was removed therefrom and washed with water to provide 17.5 kg of a styrene-isononyl acrylate copolymer (SAE). The obtained SAE had a styrene content of 60% by weight, and an isononyl acrylate content of 40% by weight.

Preparation of Graft Copolymer (1)

Pure water, tribasic calcium phosphate as a suspending agent, and sodium dodecylbenzene sulfonate were charged in amounts of 20 kg, 0.6 kg and 0.06 kg, respectively, in an autoclave having a volume of 50 l to prepare an aqueous medium. Particles of a maleic anhydride-modified propylene-ethylene copolymer (MFR: 17 g/10 min.; 5.5% by weight ethylene content; 0.4% by weight maleic anhydride content; referred to as PP(2) hereinafter) having a particle size of 3 to 4 mm were suspended in the medium by stirring. Separately, benzoyl peroxide (BPO) was dissolved in styrene (SM) and iso-nonyl acrylate (INA) and the solution was added to the suspension system. Nitrogen was introduced into the autoclave in order to substitute its interior with nitrogen. The autoclave was heated to 60° C. and the suspension was stirred at this temperature for 5 hours so as to impregnate the PP(2) particles with the styrene and iso-nonyl acrylate containing a polymerization initiator.

After the suspension was heated to 80° C., it was stirred at this temperature for 5 hours to perform polymerization. The suspension was then heated to 90° C. and was stirred at this temperature for 5 hours to complete polymerization. After cooling, the solid content was removed from the autoclave and was washed with water to provide 10 kg of particles of a styrene-iso-nonyl acrylate-modified propylene-ethylene copolymer (referred to as modified PP hereinafter). Table 5 shows the styrene content, the iso-nonyl acrylate content and the graft copolymerization amount thereof in each modified PP obtained by variously changing the charging amounts of the respective raw materials.

TABLE 5

| Modified PP No. | Charged amount (kg) | | | | Content (wt %) in modified PP | | *Grafting ratio (%) |
|---|---|---|---|---|---|---|---|
| | PP | SM | INA | BPO | SM (grafted amount) | INA (grafted amount) | |
| 1 | 5 | 3.5 | 1.5 | 0.015 | 35 (6.7) | 15 (2.9) | 19.2 |
| 2 | 6 | 2.8 | 1.2 | 0.012 | 28 (5.0) | 12 (2.2) | 18.0 |
| 3 | 7 | 2.1 | 0.9 | 0.009 | 21 (3.2) | 9 (1.4) | 15.3 |
| 4 | 5 | 3 | 2 | 0.015 | 30 (6.3) | 20 (4.2) | 21.0 |

*The grafting ratio indicates the total grafted amount in % by weight of SM and INA based on the total weight of the SM and INA in the modified PP.

An antioxidant was added to each modified PP shown in Table 5, and the mixture was sandwiched between two steel plates each having a thickness of 0.8 mm, providing a vibration-damping composite steel plate. The interlayer composition had a thickness of 0.1 to 0.2 mm.

Table 6 shows the maximum loss factor $\eta$max at 1,000 Hz, the corresponding T$\eta$max of each composite steel plate, and a maximum tan $\delta$ tan $\delta$max and a tensile elongation of each composition.

TABLE 6

| Modified PP No. | $\eta$max | T$\eta$max (°C.) | tan$\delta$max | Tensile elongation (%) |
|---|---|---|---|---|
| 1 | 0.21 | 90 | 0.53 | 550 |
| 2 | 0.20 | 90 | 0.38 | 650 |
| 3 | 0.13 | 90 | 0.26 | 880 |
| 4 | 0.20 | 70 | 0.49 | 640 |

The above-mentioned copolymer SAE obtained in preparation of the styrene-iso-nonyl acrylate copolymer and a maleic anhydride-modified polypropylene (MFR: 2 g/10 min.; 0.4% by weight maleic anhydride content; referred to as PP(3) hereinafter) were mixed in various mixing ratios, and an antioxidant was added to each mixture. The tensile elongation of each composition obtained is shown in Table 7.

TABLE 7

| Mixing Ratio (wt %) | | Tensile Elongation (%) |
|---|---|---|
| PP(3) | SAE | |
| 75 | 25 | 20 |
| 50 | 50 | 10 |
| 25 | 75 | 20 |

EXAMPLE 9

The styrene-iso-nonyl acrylate copolymer (SAE), the maleic anhydride-modified polypropylene (PP(3)) and a modified propylene-ethylene copolymer having an SM content of 30% by weight and an INA content of 20% by weight (modified PP No. 4) used in Example 8 were mixed in various mixing ratios, and an antioxidant was added to each mixture. The tensile elongation of each composition obtained was measured following the same procedures as in Example 8, and the obtained results are shown in Table 8.

TABLE 8

| Mixing Ratio (wt %) | | | Tensile Elongation (%) |
|---|---|---|---|
| Modified PP No. 4 | PP(3) | SAE | |
| 80 | 20 | — | 550 |
| 60 | 30 | 10 | 550 |
| 60 | 40 | — | 740 |
| 20 | 50 | 30 | 390 |

EXAMPLE 10

Particles of a styrene-2-ethylhexyl acrylate-modified propylene-ethylene copolymer (to be referred to as modified PP hereinafter) were prepared following the same procedures as in Example 8 except that, in the preparation of the graft copolymer (1), particles of a maleic anhydride-modified propylene-ethylene copolymer (MFR: 4 g/10 min.; 8% by weight ethylene content; and 0.4% by weight maleic anhydride content; referred to as PP (4) hereinafter) were used in place of the PP(2) and 2-ethylhexyl acrylate (2-EHA) was used in place of iso-nonyl acrylate. Table 9 shows the styrene content, the 2-ethylhexyl acrylate content and graft copolymerization amount thereof in each modified PP obtained by variously changing the charging ratios of the raw materials.

TABLE 9

| Modified PP No. | Charged amount (kg) | | | | Content (wt %) in modified PP | | *Grafting ratio (%) |
|---|---|---|---|---|---|---|---|
| | PP(4) | SM | 2-EHA | BPO | SM (grafted amount) | 2-EHA (grafted amount) | |
| 5 | 4.5 | 3.85 | 1.65 | 0.0165 | 38.5 (7.3) | 16.5 (3.1) | 19.0 |
| 6 | 4 | 4.2 | 1.8 | 0.018 | 42 (8.8) | 18 (3.8) | 21.0 |
| 7 | 3 | 4.9 | 2.1 | 0.021 | 49 (11.3) | 21 (4.8) | 23.0 |
| 8 | 5 | 1.5 | 3.5 | 0.015 | 15 (2.9) | 35 (6.6) | 19.0 |

*The grafting ratio indicates the total grafted amount in % by weight of SM and 2-EHA based on the total weight of the SM and 2-EHA in the modified PP.

EXAMPLE 11

Composite steel plates were prepared following the same procedures as in Example 8 using a composition prepared by adding an antioxidant to particles of each modified PP indicated in Table 9. Table 10 below shows the maximum loss factor ηmax at 1,000 Hz and the corresponding temperature Tηmax of each composite steel plate, and the maximum tan δ tan δmax and the tensile elongation of each composition.

TABLE 10

| Modified PP No. | ηmax | Tηmax (°C.) | tanδmax | Tensile elongation (%) |
| --- | --- | --- | --- | --- |
| 5 | 0.35 | 81 | 0.72 | 360 |
| 6 | 0.41 | 83 | 0.92 | 190 |
| 7 | 0.50 | 85 | 1.5 | 130 |
| 8 | 0.18 | 16 | 0.42 | 160 |

What is claimed is:

1. A vibration-damping composite metal plate comprising two metal plates and a resin composition sandwiched between the metal plates, said resin composition consisting essentially of 20 to 70% by weight of an amorphous thermoplastic polymer (a), and 80 to 30% by weight of a crystalline thermoplastic polymer (b) incompatible with the polymer (a), at least one of monomers constituting the amorphous polymer (a) being graft or block copolymerized with the crystalline polymer (b) in an amount not less than 0.5% by weight based on a total amount of the polymer (a), the polymer (a) being at least one member selected from the group consisting of vinyl ester polymers, polymers of aromatic vinyl monomers and arylic ester polymers, and having a glass transition temperature lower than that of the polymer (b) and having a maximum tan δ not less than 0.5 with a temperature range of −50° to 150° C. and a frequency range of 0.1 to 20,000 Hz, and the polymer (b) being one member selected from the group consisting of crystalline α-olefin resins and crystalline condensation polymers, and having a melting point higher than the glass transition temperature of the polymer (a) and a shear storage modulus not less than $1 \times 10^8$ dyne/cm$^2$ at the temperature and frequency at which the polymer (a) exhibits the maximum tan δ.

2. The composite metal plate of claim 1, wherein the amorphous thermoplastic polymer (a) is a polymer selected from the group consisting of homopolymer of acrylic ester, homopolymer of aromatic vinyl monomer, and copolymer derived from an acrylic ester and an aromatic vinyl monomer, and the crystalline thermoplastic polymer (b) is a crystalline polyolefin (B).

3. The composite metal plate of claim 1, wherein the amorphous thermoplastic polymer (a) has a maximum tan δ not less than 1.0 at the temperature −50° to 150° C. and the frequency of 0.1 to 20,000 Hz.

4. The composite metal plate of claim 1, wherein the amorphous thermoplastic polymer (a) is a copolymer derived from a styrene monomer and an acrylic monomer.

5. The composite metal plate of claim 2, wherein the acrylic ester is a member selected from the group consisting of n-butyl acrylate, 2-ethylhexyl acrylate, linevol acrylate, iso-nonyl acrylate, 2-butoxyethyl acrylate, diethyleneglycol monobutylether acrylate, lauryl methacrylate, and tridecyl methacrylate.

6. The composite metal plate of claim 2, wherein the aromatic vinyl monomer is one member selected from the group consisting of styrene, 4-methyl styrene, and α-methyl styrene.

7. The composite metal plate of claim 2, wherein the acrylic ester is one member selected from the group consisting of n-butyl acrylate, 2-ethylhexyl acrylate, linevol acrylate, iso-nonyl acrylate, 2-butoxyethyl acrylate, diethyleneglycol monobutylether acrylate, lauryl methacrylate, and tridecyl methacrylate; and the aromatic vinyl monomer is one member selected from the group consisting of styrene, 4-methyl styrene and α-methyl styrene.

8. The composite metal plate of claim 1, wherein the crystalline thermoplastic polymer (b) has shear storage modulus not less than $5 \times 10^8$ dyne/cm$^2$ at the temperature and frequency at which the polymer (a) exhibits the maximum tan δ.

9. The composite metal plate of claim 1, wherein the crystalline thermoplastic polymer (b) has a shear storage modulus not less than $6 \times 10^8$ dyne/cm$^2$ at the temperature and frequency at which the polymer (a) exhibits the maximum tan δ.

10. The composite metal plate of claim 1, wherein the crystalline thermoplastic polymer (b) is one member selected from the group consisting of high density polyethylene, polypropylene and higher α-olefin polymers higher than polypropylene.

11. The composite metal plate of claim 2, wherein the crystalline polyolefin (B) is one member selected from the group consisting of high density polyethylene and propylene polymers.

12. The composite metal plate of claim 2, wherein the crystalline polyolefin (B) is propylene polymers.

13. The composite metal plate of claim 1, comprising 30 to 60% by weight of the amorphous thermoplastic polymer (a) and 70 to 40% by weight of the crystalline thermoplastic polymer (b).

14. The composite metal plate of claim 2, wherein the content of the acrylic ester in the polymer (A) derived from the acrylic ester and the aromatic vinyl monomer is 5 to 95% by weight.

15. The composite metal plate of claim 1, wherein at least one of the monomers constituting the amorphous thermoplastic polymer (a) is graft or block copolymerized with the crystalline thermoplastic polymer (b) in an amount not less than 1% by weight based on the total amount of the polymer (a).

16. The composite metal plate of claim 1, wherein at least one of the monomers constituting the amorphous thermoplastic polymer (a) is graft or block copolymerized with the crystalline thermoplastic polymer (b) in an amount not less than 3% by weight based on the total amount of the polymer (a).

17. The composite metal plate of claim 1, wherein the crystalline thermoplastic polymer (b) has a melting point at least 30° C. higher than the glass transition temperature of the amorphous thermoplastic polymer (a).

18. The composite metal plate of claim 1, wherein the crystalline thermoplastic polymer (b) has a melting point at least 50° C. higher than the glass transition temperature of the amorphous thermoplastic polymer (a).

* * * * *